US008489897B2

(12) United States Patent
Trichina (10) Patent No.: US 8,489,897 B2
(45) Date of Patent: Jul. 16, 2013

(54) METHOD AND CIRCUITRY FOR DETECTING A FAULT ATTACK

(75) Inventor: Elena Trichina, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 154 days.

(21) Appl. No.: 13/045,406

(22) Filed: Mar. 10, 2011

(65) Prior Publication Data
US 2011/0225432 A1 Sep. 15, 2011

(30) Foreign Application Priority Data

Mar. 12, 2010 (EP) .................................... 10305250

(51) Int. Cl.
*G06F 11/30* (2006.01)

(52) U.S. Cl.
USPC ............................................ 713/190; 726/23

(58) Field of Classification Search
None
See application file for complete search history.

(56) References Cited

U.S. PATENT DOCUMENTS

| | | | | |
|---|---|---|---|---|
| 6,539,513 | B1* | 3/2003 | Chen | 714/758 |
| 7,877,615 | B2* | 1/2011 | Sohn | 713/189 |
| 7,933,282 | B1* | 4/2011 | Gupta et al. | 370/412 |
| 2003/0046541 | A1* | 3/2003 | Gerdes et al. | 713/168 |
| 2005/0050340 | A1* | 3/2005 | Lee | 713/189 |
| 2006/0045264 | A1* | 3/2006 | Kocher et al. | 380/37 |
| 2006/0104438 | A1* | 5/2006 | Giraud | 380/28 |
| 2007/0189536 | A1* | 8/2007 | Gammel et al. | 380/259 |
| 2009/0003832 | A1* | 1/2009 | Pederson et al. | 398/135 |
| 2009/0245510 | A1* | 10/2009 | Ciet et al. | 380/29 |
| 2010/0322421 | A1* | 12/2010 | Giraud | 380/255 |
| 2011/0119762 | A1* | 5/2011 | Teglia | 726/23 |
| 2011/0208966 | A1* | 8/2011 | Silverbrook | 713/168 |
| 2011/0274268 | A1* | 11/2011 | Vigilant et al. | 380/28 |
| 2011/0274271 | A1* | 11/2011 | Benteo et al. | 380/30 |

OTHER PUBLICATIONS

Daemen, J. and Rijmen, V., "The Design of Rijndael," Springer-Verlag Berlin Heidelberg: Germany, 2002.
Advanced Encryption Standard (AES), Federal Information Processing Standards, Publication 197, Nov. 26, 2001.
Gladman, B., "*A Specification for Rijndael, the AES Algorithm*", XP-002376287, May 1, 2002, pp. 1-29.
Hagai, Bar-El et al., "*The Sorcerer's Apprentice Guide to Fault Attacks*", Feb. 1, 2006, XP-002329915, 13 pages
Pflanz, M. et al., "*On-Line Techniques for Error Detection and Correction in Processor Registers with Cross-Parity Check*", Journal of Electronic Testing: Theory and Applications, Kluwer Academic Publishers, The Netherlands, vol. 19, No. 5, 2003, pp. 501-510.
Karpovsky, M. et al., "*Robust Protection against Fault-Injection Attacks on Smart Cards Implementing the Advanced Encryption Standard*", Proceedings of the 2004 International Conference on Dependable Systems and Networks (DSN'04), Jun. 28-Jul. 1, 2004, 9 pages.

* cited by examiner

*Primary Examiner* — Brandon Hoffman
*Assistant Examiner* — Carlos Amorin
(74) *Attorney, Agent, or Firm* — Seed IP Law Group PLLC (57) ABSTRACT

A method of detecting a fault attack during a cryptographic operation using at least one look-up table including a plurality of sub-tables each having a same number of values of a fixed bit length, a fixed relation existing between values at same locations in each sub-table, the method including: performing a load operation to retrieve from the look-up table data values from a same location in each sub-table; verifying that the fixed relation exists between at least two of the data values; and generating an output signal based on the verification.

33 Claims, 7 Drawing Sheets

METHOD AND CIRCUITRY FOR DETECTING A FAULT ATTACK

BACKGROUND

1. Technical Field

The present disclosure relates to a method and system for detecting fault attacks, such as a method and system for detecting fault attacks during cryptographic operations.

2. Description of the Related Art

Encryption and decryption according to the Advanced Encryption Standard (AES) is used for the transmission and/or storage of sensitive data in a wide range of systems to ensure data privacy. For this, the data is encrypted and decrypted based on the secret key known to the transmitting and receiving circuits, in other words the encryption and decryption is symmetrical.

Fault attacks are a type of attack often employed by pirates wishing to discover encryption keys to obtain the sensitive information protected by the keys. Faults are injected while a cryptographic operation is being performed by a computing device. Faults may be injected for example by under-powering the device, injecting power or clock glitches, or using a laser. Laser attacks involve sweeping the surface of the integrated circuit with a laser to inject faults, such that a bit of data is altered from a "0" bit to a "1" bit or vice versa. By analyzing the outputs of the circuit when faults are injected, the pirate can obtain information relating to the key, for example using differential fault analysis (DFA).

One solution for protecting circuits against fault attacks involves the duplication of processing circuits, each circuit operating in parallel to generate the same output data based on the same input data. The parallel outputs are then compared, and if the results do not match, this implies the presence of a fault. This duplication can also be performed in software, by executing a same operation twice using the same circuitry, and then comparing the results.

Other solutions involve performing additional operations to check that there are no faults, such as performing decryption directly after encryption, and comparing the output data with the original data. Furthermore, the use of error detection and error correction codes has also been proposed.

A problem with these existing solutions is that they rely on the duplication of circuitry, which is costly in terms of chip area, or they cause a substantial increase in computation time and/or they are complex to implement.

BRIEF SUMMARY

In an embodiment, there is provided a method of detecting a fault attack during a cryptographic operation using at least one look-up table, said look-up table comprising a plurality of sub-tables each having a same number of values of a fixed bit length, a fixed relation existing between values at same locations in each sub-table, the method comprising: performing a load operation to retrieve from said look-up table data values from a same location in each of said sub-tables; verifying that said fixed relation exists between at least two of said data values; and generating an output signal based on said verification.

According to an embodiment, the method further comprises, based on the output signal, performing an operation of the cryptographic operation using the retrieved data values.

According to an embodiment, the look-up table comprises first, second and third sub-tables, the first and second sub-tables being the same, and the data values in the third sub-table being equal to a polynomial product of the corresponding data values in the first sub-table with a fixed value, and wherein the verifying step comprises: verifying using a comparator that the data values retrieved from the first and second sub-tables are the same; and verifying that the data value retrieved from the third sub-table is equal to the polynomial product.

According to an embodiment, verifying that the data value retrieved from the third sub-table is equal to the polynomial product comprises performing an exclusive OR operation between the data value retrieved from the first sub-table and a data value retrieved from a fourth sub-table of the look-up table.

According to an embodiment, the data value at any location a in the first and second sub-tables is equal to S[a], the data value at the location a in said third sub-table is equal to the polynomial product S[a]*{03}, and the data value at the location a in the fourth sub-table is equal to the polynomial product S[a]*{02}, and wherein the verifying step comprises performing an exclusive OR operation between corresponding bits of the data values retrieved from the first and fourth sub-tables, and comparing the result of the exclusive OR with the data value retrieved from the third sub-table.

According to an embodiment, each data value retrieved from each of the sub-tables comprises one byte, and wherein the retrieve operation retrieves four or more bytes of data.

According to an embodiment, the cryptographic operation is based on a block cipher, for example a Feistel function such as the AES (Advanced Encryption Standard) algorithm.

According to an embodiment, if the verification indicates that the fixed relation does not exist between the retrieved data values, the cryptographic operation is reset.

According to an embodiment, the cryptographic operation comprises a rotation operation of the data values retrieved from the look-up table.

According to an embodiment, there is provided circuitry for performing a cryptographic operation using at least one look-up table, the look-up table comprising a plurality of sub-tables each having a same number of values of a fixed bit length, a fixed relation existing between values at same locations in each sub-table, the circuitry comprising: load circuitry arranged to load to a register from the look-up table data values from a same location in each of the sub-tables; and a verification block arranged to verify that the fixed relation exists between at least two of the data values stored in the register and to generate an output signal based on the verification.

According to an embodiment, the circuitry comprises a computation unit arranged to perform operations of the cryptographic operation based on the output signal.

According to an embodiment, the verification block comprises a logic unit arranged to perform the exclusive OR of corresponding bits of first and second values stored in the register, and a comparator unit arranged to compare the output of the logic unit with a third value stored in the register.

According to an embodiment, there is provided an electronic device comprising the above circuitry.

According to an embodiment, there is provided an IC (integrated circuit) card comprising an integrated circuit comprising the above circuitry.

In an embodiment, a method comprises: performing a cryptographic operation using a plurality of look-up tables, a fixed relation existing between values at corresponding locations in each table of the plurality of look-up tables; and detecting a fault attack during the cryptographic operation by: performing a load operation to retrieve from said look-up tables data values from corresponding locations in each of said look-up tables; verifying that said fixed relation exists between at least two of said retrieved data values; and generating an output signal based on said verification, wherein the detecting is performed by an electronic device. In an embodiment, performing the cryptographic operation comprises, based on said output signal, performing an operation of said cryptographic operation using said retrieved data values. In an embodiment, said plurality of look-up tables comprises first, second and third sub-tables of a single table, said first and second sub-tables being having same data values, and the data values in said third sub-table being a polynomial product of the corresponding data values in said first sub-table with a fixed value, and wherein said verifying step comprises: verifying using a comparator of the electronic device that the data values retrieved from said first and second sub-tables are the same; and verifying that the data value retrieved from said third sub-table is equal to said polynomial product. In an embodiment, verifying that the data value retrieved from said third sub-table is equal to said polynomial product comprises performing an exclusive OR operation between the data value retrieved from said first sub-table and a data value retrieved from a fourth sub-table of said single table. In an embodiment, each sub-table of the single table has a same number of data values of a fixed bit-length, the data value at any location a in said first and second sub-tables is equal to S[a], the data value at the location a in said third sub-table is equal to the polynomial product S[a]*{03}, and the data value at the location a in the fourth sub-table is equal to the polynomial product S[a]*{02}, and wherein said verifying step comprises performing an exclusive OR operation between corresponding bits of the data values retrieved from the first and fourth sub-tables, and comparing a result of said exclusive OR with the data value retrieved from said third sub-table. In an embodiment, each data value retrieved from each of said tables comprises one byte, and wherein said retrieve operation retrieves four or more bytes of data. In an embodiment, said cryptographic operation is based on a block cipher. In an embodiment, said cryptographic operation is based on an Advanced Encryption Standard algorithm. In an embodiment, if said verification indicates that said fixed relation does not exist between said retrieved data values, the method comprises resetting said cryptographic operation. In an embodiment, said cryptographic operation comprises a rotation operation of said data values retrieved from said look-up tables.

In an embodiment, a device comprises: a cryptographic operation block configured to perform a cryptographic operation using at least one look-up table having a plurality of sub-tables with a fixed relation existing between values at corresponding locations in each sub-table of the plurality of sub-tables, the cryptographic operation block including a register and configured to load from said look-up table data values from corresponding locations in each of said sub-tables into the register; and a verification block configured to verify that said fixed relation exists between at least two of said data values loaded in said register and to generate an output signal based on said verification. In an embodiment, the cryptographic operation block comprises a computation unit configured to perform operations of said cryptographic operation based on said output signal. In an embodiment, said verification block comprises logic configured to perform an exclusive OR of corresponding bits of first and second values loaded in said register, and a comparator configured to compare the output of said logic unit with a third value loaded in said register. In an embodiment, each sub-table of the plurality of sub-tables has a same number of values of a fixed bit-length. In an embodiment, the device comprises an integrated circuit card including an integrated circuit having the cryptographic operation block and the verification block.

In an embodiment, a system comprises: a memory configured to store a look-up table having a plurality of sub-tables with a fixed relationship existing between values at a corresponding locations in the plurality of sub-tables; a cryptographic operation block configured to perform a cryptographic operation using the look-up table, the cryptographic operation block including a register and configured to load from said look-up table data values from corresponding locations in each of said sub-tables into the register; and a verification block configured to verify that said fixed relation exists between at least two of said data values loaded in said register. In an embodiment, the cryptographic operation block comprises a computation unit configured to perform operations of said cryptographic operation based on said output signal. In an embodiment, said verification block comprises logic configured to perform an exclusive OR of corresponding bits of first and second values loaded in said register, and a comparator configured to compare the output of said logic unit with a third value loaded in said register. In an embodiment, the cryptographic operation block is configured to, based on an output signal from the verification block, perform an operation of said cryptographic operation using said loaded data values. In an embodiment, each sub-table of the plurality has a same number of data values of a fixed bit-length, the data value at any location a in said first and second sub-tables is equal to S[a], the data value at the location a in said third sub-table is equal to the polynomial product S[a]*{03}, and the data value at the location a in the fourth sub-table is equal to the polynomial product S[a]*{02}, and wherein said verification block includes logic configured to perform an exclusive OR operation between corresponding bits of the data values loaded into the register from the first and fourth sub-tables, and a comparator configured to compare a result of said exclusive OR with the data value loaded into the register from said third sub-table. In an embodiment, each data value loaded from each of said sub-tables into the register comprises one byte, and wherein four or more bytes of data are loaded from the table into the register. In an embodiment, said cryptographic operation block is configured to perform a cryptographic operation based on a block cipher. In an embodiment, said cryptographic operation block is configured to perform a cryptographic operation based on an Advanced Encryption Standard algorithm. In an embodiment, the cryptographic operation block is configured to reset when an output from the verification block indicates that said fixed relation does not exist between said loaded data values. In an embodiment, said cryptographic operation block is configured to perform a rotation operation of said data values loaded from said look-up table.

In an embodiment, a device comprises: means for performing a cryptographic operation using data values retrieved from a plurality of look-up tables with a fixed relation existing between values at corresponding locations in each table of the plurality of look-up tables; means for retrieving from said look-up tables data values from corresponding locations in each of said look-up tables; and means for verifying that said fixed relation exists between at least two retrieved data values. In an embodiment, the means for performing a cryptographic operation comprises a computation unit configured to perform operations of said cryptographic operation based on an output of the means for verifying. In an embodiment, said means for verifying comprises: means for performing an exclusive OR of corresponding bits of first and second values retrieved by the means for retrieving; and means for comparing an exclusive OR result with a third value retrieved by the means for retrieving. In an embodiment, the plurality of tables are a plurality of sub-tables of a single look-up table.

In an embodiment, a non-transitory computer-readable medium's contents cause at least one processing device to perform a method, the method comprising: performing a cryptographic operation using data values retrieved from a look-up table having a plurality of sub-tables with a fixed relation existing between values at corresponding locations in each sub-table of the plurality of sub-tables; retrieving from said look-up table data values from corresponding locations in each of said sub-tables; and verifying that said fixed relation exists between at least two retrieved data values. In an embodiment, the performing the cryptographic operation is based on the verifying. In an embodiment, the verifying comprises: performing an exclusive OR of corresponding bits of first and second values retrieved from the look-up table; and comparing a result of performing the exclusive OR with a third value retrieved from the look-up table.

BRIEF DESCRIPTION OF THE SEVERAL VIEWS OF THE DRAWINGS

The foregoing and other purposes, features, aspects and advantages of embodiments are illustrated in the following detailed description of example embodiments, given by way of illustration and not limitation with reference to the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, cryptographic devices, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

For clarity, only those steps and elements useful in an understanding of the illustrated embodiments have been represented in the figures and will be described in detail. For example, circuitry for resetting an integrated circuit or rendering it inactive upon detection of one or more faults has not been detailed, the embodiments being applicable to any such circuits. Furthermore, the functions of the integrated circuit being protected have not been described in detail, embodiments being compatible with integrated circuits implementing a broad range of functions, from data transmission over local area networks (LANs) or wireless LANs, to data transfer to and from an IC (integrated circuit) card, etc.

Example embodiments are described in relation to an implementation of the AES encryption algorithm. However, it will be apparent to those skilled in the art that embodiments can apply equally to AES decryption, which may typically implement inverse operations in a slightly different order. Furthermore, embodiments may be applied to other cryptographic operation, such as encryption, decryption, key generation or tag generation, etc., which are also based on the AES block cipher, or more broadly to any cryptographic operations that use look-up tables between which there is a known relation.

Figure 1:
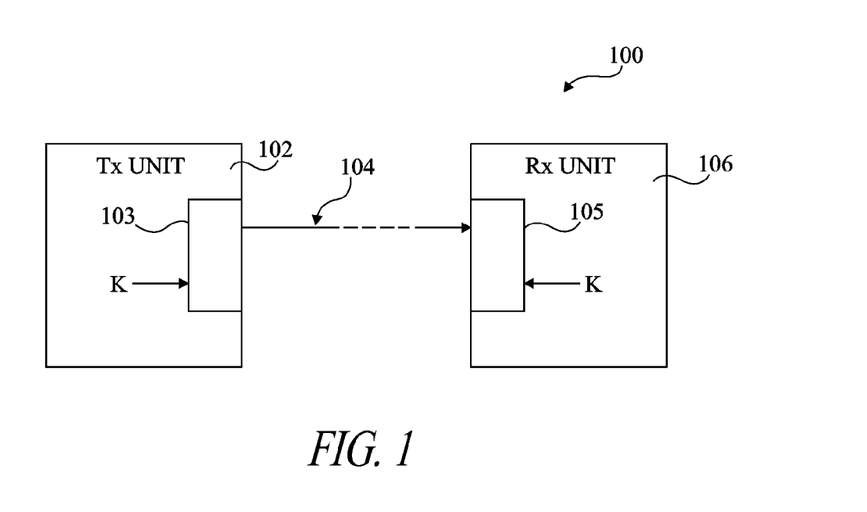
FIG. 1, described above, illustrates an example of a data transmission system using data encryption.

FIG. 1 illustrates a data encryption and decryption system 100 using AES in which a transmit unit 102 transmits, using an AES encryption block 103, packets of sensitive data over a communications path 104 to an AES decryption block 105 of a receive unit 106. Both the encryption and decryption blocks 103, 105 receive a common key K, for example stored in respective memories (not illustrated) of the transmit and receive units 102, 106. The communications path 104 could comprise a wide range of connections, including an interface between an integrated circuit (IC) card and card reader, wired or wireless network connection, etc. Furthermore, the transmit and receive units 102, 106 could be part of a memory access device, the communications path 104 being used to store the encrypted data in a memory (not shown).

The receive and/or transmit units 102, 106 may be subject to attacks from pirates wishing to break the AES encryption to obtain the key K and thereby access the sensitive information.

Figure 2:
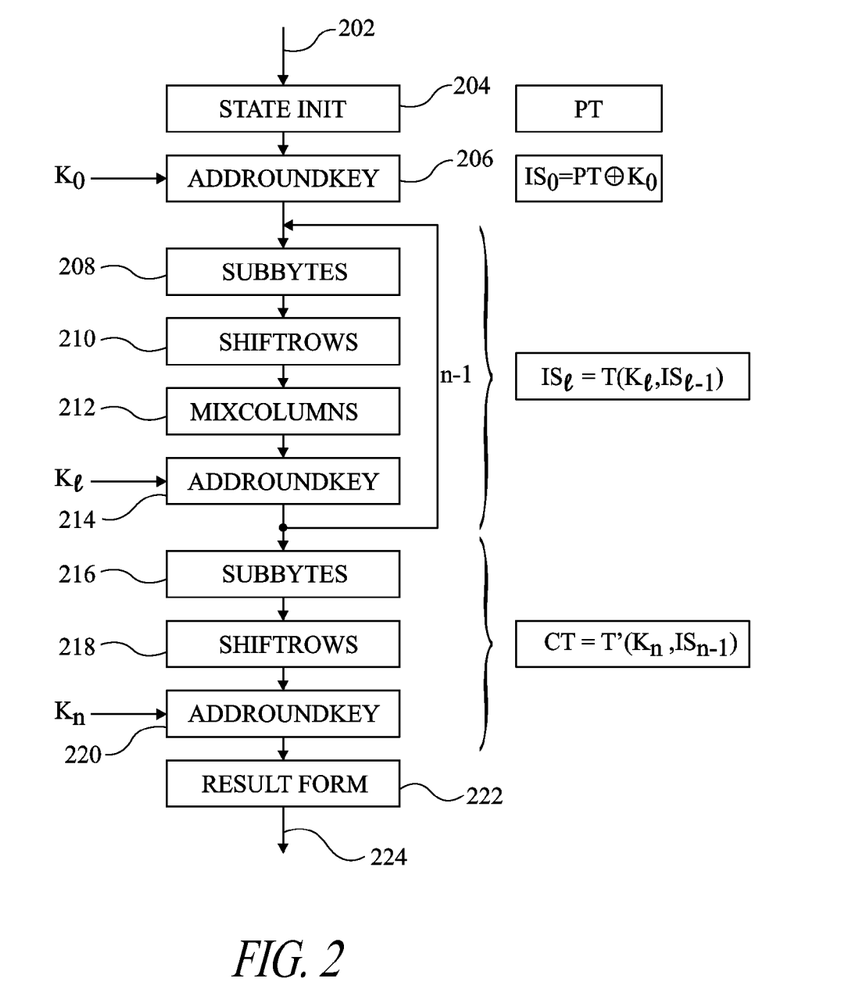
FIG. 2 is a block diagram illustrating stages for implementing an AES encryption algorithm according to one embodiment.

FIG. 2 is a block diagram illustrating the operation of a round logic unit for encryption according to AES. This encryption algorithm is described in more detail in the publication "The Design of Rijndael" by Joan Daemen and Vincent Rijmen, available from Springer-Verlag (ISBN 3-540-42580-2) and in the AES standard (FIPS PUB 197).

The algorithm encodes blocks of plain text received at an input 202, such as data or nonce, each block for example comprising 128 bits. The output is an encoded block of data of the same size. Each step in the algorithm processes a matrix, referred to herein as a state, comprising 128 bits arranged in four rows and four columns of elements, each element being a byte. Standard AES encryption is based on a 128-bit standard key, although other sizes such as 192 and 256 key sizes may also be supported.

The process starts with an initial state 202 (STATE INIT) comprising the 128 bits of plaintext (PT) to be encrypted.

An initial round is performed having a single step 206 (ADDROUNDKEY), which comprises performing an XOR operation bitwise on each of the elements of the initial state with a key $K_0$ to obtain a first intermediate state $IS_0$. For all following rounds the round sub-keys $K_1$ to $K_n$ are generated by expanding the key $K_0$ using a key schedule (not illustrated).

Next, a number n−1 of rounds of a same transformation T are performed, each round resulting in an intermediate state $IS_1$ generated by processing the previous intermediate state $IS_{1-1}$ and a current sub-key $K_1$. The number n−1 of rounds employed is the number of sub-keys generated minus 1. If the secret key is 128 bits, ten sub-keys are generated, and therefore this transformation is repeated nine times. Each transformation T comprises four operations, which will now be described.

A first operation SUBBYTES 208 comprises a non-linear transformation in which each byte of the matrix of the previous state $IS_{l-1}$ is replaced by its image in a pre-calculated substitution table, known as an S-box. In other words, each input byte to the S-box is mapped to an output byte. Thus an S-box contains 256 bytes of data. The S-box corresponds to the combination of two transformations. Firstly, each byte of the state is replaced by its reciprocal in the finite field of size $2^8$ (to correspond to a byte), except for 0, which has no reciprocal, and is thus replaced by itself. Secondly, an affine transformation f is applied, comprising in the bitwise matrix multiplication with a fixed 8 by 8 binary matrix, followed by XOR with the hexadecimal value $\{63\}$.

The output state of the subbytes operation having values $b\_\{i,j\}$ in each row and column j, can be expressed as:

$$\begin{vmatrix} b\_\{0,j\} \\ b\_\{1,j\} \\ b\_\{2,j\} \\ b\_\{3,j\} \end{vmatrix} = \begin{vmatrix} S[a\_\{0,j\}] \\ S[a\_\{1,j\}] \\ S[a\_\{2,j\}] \\ S[a\_\{3,j\}] \end{vmatrix}$$

where $a\_\{i,j\}$ is the byte in row i and column j of the state a, which is the state at the start of each round, initially equal to $IS_0$, and then $IS_1$. $S[a\_\{i,j\}]$ is the byte retrieved from the S-box corresponding to the input byte $a\{i,j\}$.

A second operation SHIFTROWS 210 comprises performing a rotation on the three bottom rows of the matrix resulting from the previous operation 208, and rotates the second row by one byte, the third row by two bytes, and the fourth row by three bytes. The output state of the shiftrows operation having values $c\_\{i,j\}$ in each row i and column j can be expressed based on the results of the subbytes operation, as:

$$\begin{vmatrix} c\_\{0,j\} \\ c\_\{1,j\} \\ c\_\{2,j\} \\ c\_\{3,j\} \end{vmatrix} = \begin{vmatrix} b\_\{0,j\} \\ b\_\{1,j-1\} \\ b\_\{2,j-2\} \\ b\_\{3,j-3\} \end{vmatrix}$$

The indexes j-I, where I=1, 2, 3, are taken modulo 4.

The first and second operations 208 and 210 can be inverted.

A third operation MIXCOLUMNS 212 comprises considering each column of the matrix resulting from the previous operation as a coefficient of a 4-term polynomial within the limited field of size $2^8$, and multiplying them, modulo $x^4+1$, with fixed polynomial $\{03\}x^3+\{01\}x^2+\{01\}x+\{02\}$. The output state of the mixcolumns operation having values $d\_\{i,j\}$ in each row i and column j, can thus be expressed based on the results of the shiftrows operation as:

$$\begin{vmatrix} d\_\{0,j\} \\ d\_\{1,j\} \\ d\_\{2,j\} \\ d\_\{3,j\} \end{vmatrix} = \begin{vmatrix} 02 & 03 & 01 & 01 \\ 01 & 02 & 03 & 01 \\ 01 & 01 & 02 & 03 \\ 03 & 01 & 01 & 02 \end{vmatrix} * \begin{vmatrix} c\_\{0,j\} \\ c\_\{1,j\} \\ c\_\{2,j\} \\ c\_\{3,j\} \end{vmatrix}$$

A fourth operation ADDROUNDKEY 214 comprises applying the current sub-key $K_1$ by performing the XOR function bitwise between the sub-key and the state d resulting from the previous operation 212. This operation is the same as the operation 206, but with a different sub-key, and provides intermediate state IS'. The output state of the addroundkey operation 214 having values $e\_\{i,j\}$ in each row i and column j, can thus be expressed based on the results of the shiftrows operation as:

$$\begin{vmatrix} e\_\{0,j\} \\ e\_\{1,j\} \\ e\_\{2,j\} \\ e\_\{3,j\} \end{vmatrix} = \begin{vmatrix} d\_\{0,j\} \\ d\_\{1,j\} \\ d\_\{2,j\} \\ d\_\{3,j\} \end{vmatrix} \oplus \begin{vmatrix} k_1\_\{0,j\} \\ k_1\_\{1,j\} \\ k_1\_\{2,j\} \\ k_1\_\{3,j\} \end{vmatrix}$$

where $|k_l\_\{0,j\}|$ is the top row of the 128 bit sub-key l represented in a four by four matrix of bytes.

At the end of the n-1$^{th}$ round, operation 214 provides intermediate state $IS_{n-1}$.

Next, a transformation T', forming the last round, processes the intermediate state $IS_{n-1}$ and last sub-key $K_n$. Transformation T' performs successively SUBBYTE operation 216, SHIFTROWS operation 218 and ADDROUNDKEY operation 220 using the last sub-key $K_n$. Hence, transformation T' corresponds to transformation T without the MIXCOLUMNS operation.

If needed, a last step 222 (RESULT FORM) puts the result (ciphered text CT) into the appropriate form to be outputted at an output 224.

The sub-keys, a different one for each round of the encryption algorithm, are generated by a key schedule unit. The key schedule uses S-boxes to generate the sub-keys from key K.

The operations 208 to 214 of each n−1 rounds described above can be performed very rapidly using a software implementation based on a 32-bit processor by using transformation tables, herein after referred to as T-tables. Such an implementation is for example explained in the publication titled "A specification for Rijndael, the AES Algorithm", by Joan Daemen and Vincent Rijmen, the contents of which is hereby incorporated by reference.

For example, it can be shown that the operations in each round combine to the following:

$$\begin{vmatrix} e\_\{0,j\} \\ e\_\{1,j\} \\ e\_\{2,j\} \\ e\_\{3,j\} \end{vmatrix} = \begin{vmatrix} 02 & 03 & 01 & 01 \\ 01 & 02 & 03 & 01 \\ 01 & 01 & 02 & 03 \\ 03 & 01 & 01 & 02 \end{vmatrix} * \begin{vmatrix} S[\{0,j\}] \\ S[\{1,j\}] \\ S[\{2,j\}] \\ S[\{3,j\}] \end{vmatrix} \oplus \begin{vmatrix} k\_\{0,j\} \\ k\_\{1,j\} \\ k\_\{2,j\} \\ k\_\{3,j\} \end{vmatrix}$$

where $|e\_\{i,j\}|$ is the byte in row i and column j in the resulting state e of a round. This can in turn be represented as a linear combination of vectors:

$$\begin{vmatrix} e\_\{0,j\} \\ e\_\{1,j\} \\ e\_\{2,j\} \\ e\_\{3,j\} \end{vmatrix} = S[a_{0,j}] * \begin{vmatrix} 02 \\ 01 \\ 01 \\ 03 \end{vmatrix} \oplus S[a_{1,j-1}] * \begin{vmatrix} 03 \\ 02 \\ 01 \\ 01 \end{vmatrix}$$

$$\oplus S[a_{2,j-2}] * \begin{vmatrix} 01 \\ 03 \\ 02 \\ 01 \end{vmatrix} \oplus S[a_{3,j-3}] * \begin{vmatrix} 01 \\ 01 \\ 03 \\ 02 \end{vmatrix} \oplus \begin{vmatrix} k\_\{0,j\} \\ k\_\{1,j\} \\ k\_\{2,j\} \\ k\_\{3,j\} \end{vmatrix}$$

The multiplication factors $S[a_{i,j}]$ of the four vectors can be obtained by performing a table lookup on the input bytes $a_{i,j}$ in the S-box. It is thus possible to define the following four tables for performing a whole round operation:

$$T_0 = \begin{vmatrix} |S[a]*\{02\}| \\ |S[a]| \\ |S[a]| \\ |S[a]*\{03\}| \end{vmatrix}$$

$$T_1 = \begin{vmatrix} |S[a]*\{03\}| \\ |S[a]*\{02\}| \\ |S[a]| \\ |S[a]| \end{vmatrix}$$

$$T_2 = \begin{vmatrix} |S[a]| \\ |S[a]*\{03\}| \\ |S[a]*\{02\}| \\ |S[a]| \end{vmatrix}$$

$$T_3 = \begin{vmatrix} |S[a]| \\ |S[a]| \\ |S[a]*\{03\}| \\ |S[a]*\{02\}| \end{vmatrix}$$

Thus, based on these tables, the round transformation can be expressed as:

$$e\_j = T_0[a\_\{0,j\}] \oplus T_1[a\_\{1,j-1\}] \oplus T_2[a\_\{2,j-2\}] \oplus T_3[a\_\{3,j-3\}] \oplus k\_j$$

Each table $T_0$ to $T_3$ is thus the size of four S-boxes, having four rows of 256 bytes, and contains 1 kB of data.

To reduce memory resources by a factor of 4, the four tables $T_0$ to $T_3$ can be reduced to a single table, such as table $T_0$, if rotations of the values in that table are performed. In particular, it has been observed that $T_j[a]=\text{ROT1B}(T_{j-1}[a])$, where ROT1B( ) is a rotation of the table values by one byte. In particular, assuming a column in the table has four bytes at positions 0 to 3 from the top position to the bottom position, the rotation is such that the bytes in positions 0, 1 and 2 move to positions 1, 2 and 3 respectively, and the byte in position 3 moves to position 0. Thus, the equation becomes:

$$e\_j = k\_j \oplus T_0[b_{0,j}] \oplus \text{ROT1}B(T_0[b_{1,j-1}]) \oplus \text{ROT2}B(T_0[b_{2,j-2}]) \oplus \text{ROT3}B(T_0[b_{3,j-3}]) \quad (1)$$

where ROT2B( ) is a rotation of the first table by two bytes such that the byte in positions 0 and 1 swap places with the bytes in positions 2 and 3 respectively, and ROT3B moves the bytes in positions 1 to 3 to positions 0 to 2 respectively, and the byte in position 0 to position 3.

Figure 3A:
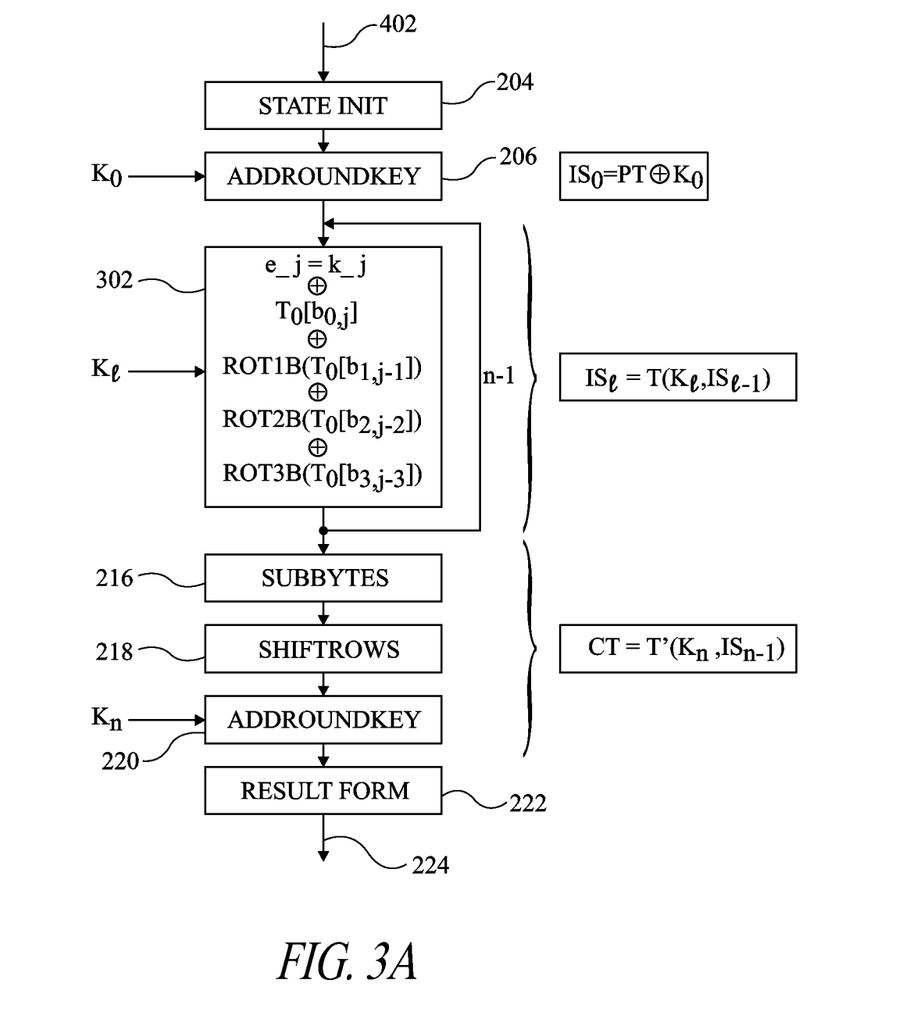
FIG. 3A is a block diagram illustrating stages for implementing an AES encryption algorithm using T-tables according to an embodiment.

FIG. 3A shows stages for implementing an AES encryption algorithm based on a T-table. Those parts described in FIG. 2 have been labeled with like reference numerals, and only the new parts will be described in detail.

The round stages 208 to 214 of FIG. 2 are replaced in FIG. 3 by a stage 302, which implements equation (1) above, for each column j=0 to 3 of the state, based on the corresponding column k_j of the corresponding key $K_1$.

The final round, comprising steps 216, 218 and 220, but not the mix columns operation, may be performed using S-box tables stored separately. In an alternative embodiment, to save memory space, the S-box data may be retrieved from table $T_0$, by masking certain values when executing the final round.

Figure 3B:
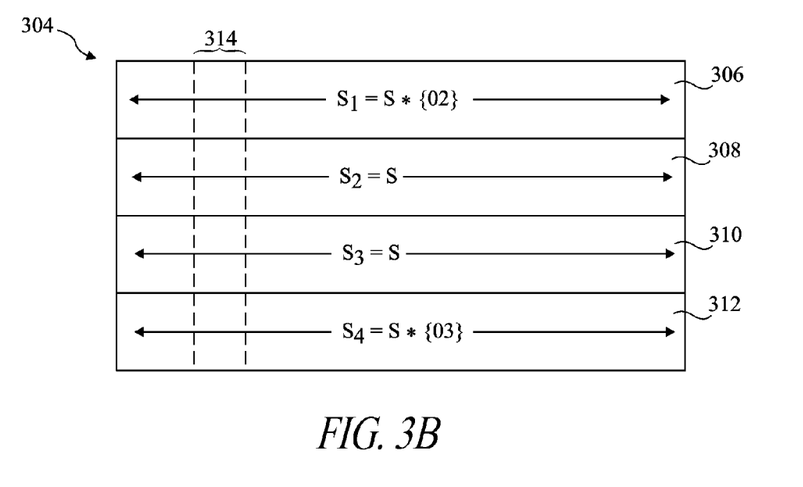
FIG. 3B illustrates an example of a T-table according to an embodiment.

FIG. 3B illustrates an example of a T-table 304, in this example $T_0$, comprising four sub-tables $S_1$, $S_2$, $S_3$ and $S_4$, each 256 bytes wide, stored in four corresponding rows 306, 308, 310 and 312 of the T-table 304. As this T-table corresponds to table $T_0$, the sub-tables $S_2$ and $S_3$ comprise the values of the S-box, while sub-table $S_1$ comprises the values of the S-box but with each value multiplied in the finite field $2^8$ by the hexadecimal value $\{02\}$, and sub-table $S_2$ comprises the values of the S-box, but with each value multiplied in the finite field $2^8$ by the hexadecimal value $\{03\}$. Thus any column of the T-table 304 one byte wide, such as the column 314, will contain 32 bits in 4 bytes, one byte taken from each row 306 to 312.

To access the values of the T-table during a round operation, the T-table 304 is addressed using the byte a{i,j} of state a during a load operation, and the appropriate 32-bit values are read to a register. From there, these values may be manipulated by the round logic unit during a cryptographic operation.

The present inventor has deduced that fault attacks are likely to occur during a load operation of T-table data from memory to the register. However, it can be assumed that while a pirate may be able to corrupt a byte or word at will, they cannot choose the exact value of the injected error.

Figure 4:
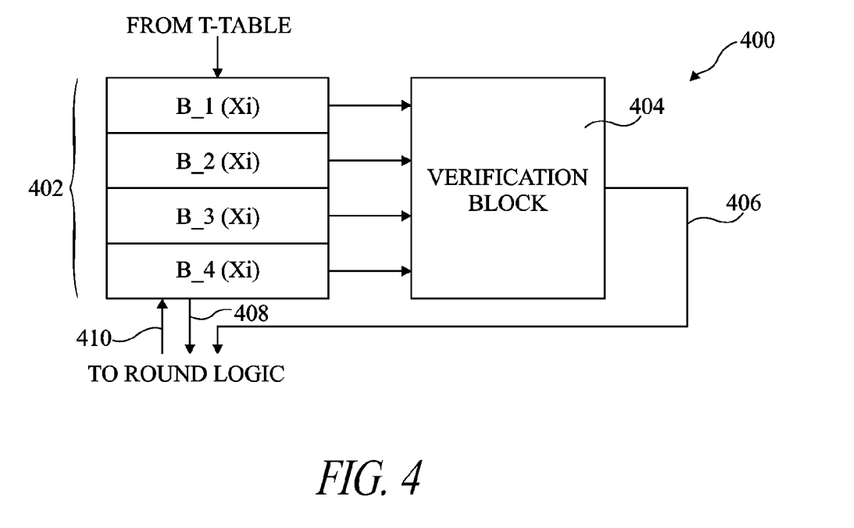
FIG. 4 is a block diagram illustrating circuitry for detecting a fault attack according to an embodiment.

FIG. 4 is a block diagram illustrating a system 400 which includes logic configured to detect the presence of a fault attack, based on the data values stored in a register 402 directly after a load operation.

In response to a T-table load instruction, the 4-byte value retrieved from the T-table (not shown in FIG. 4) will be called Xi, and each byte called respectively B_1 (Xi), B_2(Xi), B_3(Xi) and B_4(Xi). These values are stored in the register 402, and prior to being used by round logic unit (also not shown in FIG. 4) during a round operation, they are verified by the verification block 404, to check that there exist the expected relations between the bytes. For example, block 404 may check the validity of each of the bytes with respect to at least one other byte, to ensue that no fault has been injected in any of the four bytes.

An output line 406 of the verification block 404 provides the result of the verification. If the verification block 404 determines that there is no fault, a pass signal is output on line 406 to the round logic unit, indicating that the values in register 402 are valid and may be used during the round operation. The values in the register 402 may then be accessed by the round logic unit via an output line 408 and an input line 410 of the register 402.

Alternatively, if a fault is detected by the verification block 404, a fail signal is output on line 406 to the round logic unit. In this case, the fail signal indicates to that round logic unit that the values in the register contain one or more faults and therefore should not be used during the round operation, and the round logic is for example reset. Furthermore, the fail signal may result in one or more other measures being taken, such as incrementing a counter, which permanently deactivates the chip when a certain number of faults have been detected.

More than one register may be used for receiving values loaded from the T-table, and similar logic could be provided for each register. Furthermore, this verification block 404 can be used in implementations that used the four T-tables $T_0$ to $T_3$ described above, or the one T-table implementation described with relation to FIG. 3A above.

Figure 5:
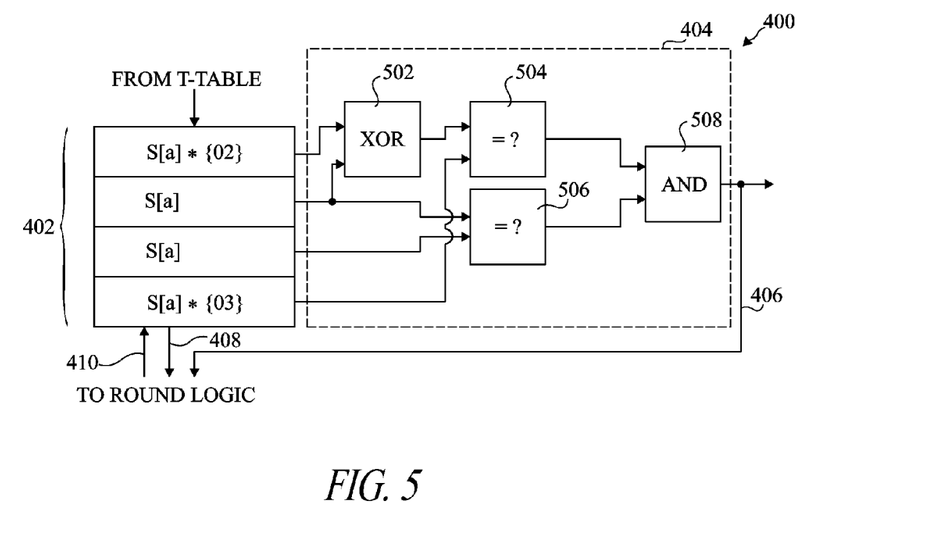
FIG. 5 illustrates the circuitry of FIG. 4 in more detail according an embodiment.

FIG. 5 shows the system 400 of FIG. 4, but illustrates in more detail the verification block 404 according to one example. This case applies to the case that the T-table bytes B_1(Xi), B_2(Xi), B_3(Xi) and B_4(Xi) in register 402 correspond respectively to the S-box values S[a]*{02}, S[a], S[a] and S[a]*{03}, in other words the T-table is $T_0$.

An XOR block 502 receives the values of bytes B_1(Xi) and B_2(Xi), and performs a bitwise exclusive OR of these values. The resulting output byte of the XOR block 502 is provided to one input of a comparator 504, a second input of which receives the byte B_4(Xi). The comparator 504 compares these two input bytes, again bitwise, and for example outputs a high value when the corresponding bits match, or a low value if one or more bits do not match.

Additionally, the values of bytes B_2(Xi) and B_3(Xi) are input to a comparator 506, which performs a bitwise comparison of these bytes, and again for example outputs a high value when the corresponding bits match, or a low value if one or more bits do not match.

The outputs of comparators 504 and 506 are coupled to respective inputs of a 2-input AND gate 508. Thus if the input bytes to both comparator 504 and comparator 506 match, the output of AND gate 508 will be high, indicating a pass signal, whereas if either of the comparisons detects a mis-match, the output of the AND gate 508 will be low, indicating the presence of a fault.

Indeed, the inventor has discovered that an XOR of bytes B_1(Xi) and B_2(Xi), i.e., the XOR of S[a]*{02} and S[a], should equal B_4(Xi) i.e., S[a]*{03}. Furthermore, bytes B_2(Xi) and B_3(Xi) should always be equal, as both correspond to values S[a] taken from identical sub-tables.

Figure 6:
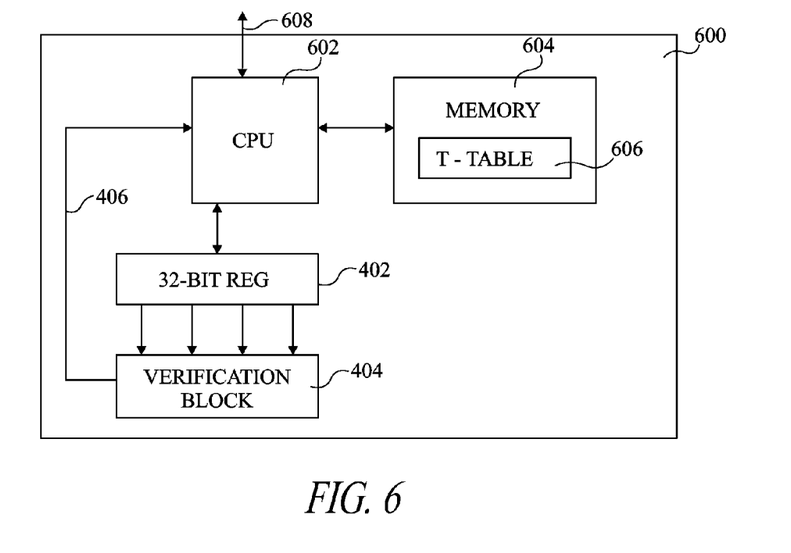
FIG. 6 illustrates an encryption or decryption device according to an embodiment.

FIG. 6 illustrates an electronic device 600 comprising a central processing unit (CPU) 602 coupled to a memory 604. The CPU 602 for example uses a 32-bit architecture, allowing load and write operations on 32 bits at a time. Memory 604 is for example a non-volatile memory, and stores a T-Table 606. The CPU is also coupled to the register 402 to which 32-bit values from the T-table 606 are loaded, and the verification block 404, which verifies the relations between the bytes of the 32-bit value. In this example, the CPU 602 performs the role of the round logic unit, performing for example an encryption or decryption round operation based on the values from the T-table, and receives and/or transmits encrypted data and/or plain text on a line 608. The output of the verification block 404 on line 406 is provided to the CPU in the form of an alert signal.

The device 600 is for example an integrated circuit (IC) card, IC card reader, wired or wireless network interface, memory access device, or other electronic device performing encryption, decryption, key or tag generation operations based on a T-table.

An advantage of some embodiments described herein is that fault detection is extremely low cost given that it is performed by a simple verification of four bytes of data, and uses very little computation logic. Furthermore, this processing can be performed very quickly, and thus will not unduly occupy processing resources. A further advantage of some embodiments is that the solution does not require additional storage space, as the register 402 used to store loaded T-table values can be the same register used for the round operation based on the loaded T-table values.

Furthermore, some embodiments described herein result in a high probability that an error will be detected. For example, the inventor has show that, using the logic operations of the verification block 404 of FIG. 5, the chance of missing an error is less that $½^{32}$, in other words less than $6 \times 10^{-5}$.

While a number of particular embodiments have been described, it will be apparent to those skilled in the art that numerous variations and alterations may be applied.

For example, it will be apparent that concepts and embodiments described herein could be applied to a T-table implementation based on one or more than one T-table.

Furthermore, while example embodiments have been described in relation to an implementation of AES encryption, it will be apparent to those skilled in the art that it could be applied to other types of encryption, decryption, tag or key generation operations. Furthermore, the example of FIG. 5 of the logic operations performed to verify the bytes loaded from the T-table could be modified while achieving the same result. For example, rather than receiving four bytes from the T-table, a different number of bytes may be received. Furthermore, it would also be possible to perform an exclusive OR between the bytes B_2(Xi) and B_3(Xi), and compare this result with the byte B_1(Xi). Other types of logic operations could be performed, depending on the particular relations between the sub-tables in the T-table.

Furthermore, the embodiments have been described in relation to a 32-bit processor, but embodiments could be applied in systems based a different number of bits, such 16 or 64-bits, a comparison of the bytes still be possible to verify expected relationships. The verification block 404 described herein could be implemented in software, hardware or a combination thereof. Additionally, the features described in relation to the various embodiments could be combined in any combination in alternative embodiments.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), logic gates, etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing a cryptographic operation using a plurality of look-up tables, a fixed relation existing between values at corresponding locations in each table of the plurality of look-up tables, wherein said plurality of look-up tables comprises first, second and third sub-tables of a single table, said first and second sub-tables having same data values, and the data values in said third sub-table being a polynomial product of the corresponding data values in said first sub-table with a fixed value; and
detecting a fault attack during the cryptographic operation by:
performing a load operation to retrieve from said look-up tables data values from corresponding locations in each of said look-up tables;
verifying that said fixed relation exists between at least two of said retrieved data values; and
generating an output signal based on said verification, wherein the load operation, the verifying and the generating are performed using one or more configured processing devices.

2. The method of claim 1 wherein performing the cryptographic operation comprises, based on said output signal, performing an operation of said cryptographic operation using said retrieved data values.

3. The method of claim 1 wherein said verifying step comprises:
verifying using a comparator of the electronic device that the data values retrieved from said first and second sub-tables are the same; and
verifying that the data value retrieved from said third sub-table is equal to said polynomial product.

4. The method of claim 3 wherein verifying that the data value retrieved from said third sub-table is equal to said polynomial product comprises performing an exclusive OR operation between the data value retrieved from said first sub-table and a data value retrieved from a fourth sub-table of said single table.

5. The method of claim 4 wherein each sub-table of the single table has a same number of data values of a fixed bit-length, the data value at any location a in said first and second sub-tables is equal to S[a], the data value at the location a in said third sub-table is equal to the polynomial product S[a]*{03}, and the data value at the location a in the fourth sub-table is equal to the polynomial product S[a]*{02}, and wherein said verifying step comprises performing an exclusive OR operation between corresponding bits of the data values retrieved from the first and fourth sub-tables, and comparing a result of said exclusive OR with the data value retrieved from said third sub-table.

6. The method of claim 1 wherein each data value retrieved from each of said tables comprises one byte, and wherein said retrieve operation retrieves four or more bytes of data.

7. The method of claim 1 wherein said cryptographic operation is based on a block cipher.

8. The method of claim 1 wherein said cryptographic operation is based on an Advanced Encryption Standard algorithm.

9. The method of claim 1 wherein if said verification indicates that said fixed relation does not exist between said retrieved data values, the method comprises resetting said cryptographic operation.

10. The method of claim 1 wherein said cryptographic operation comprises a rotation operation of said data values retrieved from said look-up tables.

11. A device, comprising:
a cryptographic operation block configured to perform a cryptographic operation using at least one look-up table having a plurality of sub-tables with a fixed relation existing between values at corresponding locations in each sub-table of the plurality of sub-tables, the cryptographic operation block including a register and configured to load from said look-up table data values from corresponding locations in each of said sub-tables into the register; and
a verification block configured to verify that said fixed relation exists between at least two of said data values loaded in said register and to generate an output signal based on said verification, wherein said verification block comprises logic configured to perform an exclusive OR of corresponding bits of first and second values loaded in said register, and a comparator configured to compare the output of said logic unit with a third value loaded in said register.

12. The device of claim 11 wherein the cryptographic operation block comprises a computation unit configured to perform operations of said cryptographic operation based on said output signal.

13. The device of claim 11 wherein each sub-table of the plurality of sub-tables has a same number of values of a fixed bit-length.

14. The device of claim 11 wherein the device comprises an integrated circuit card including an integrated circuit having the cryptographic operation block and the verification block.

15. A system, comprising:
a memory configured to store a look-up table having a plurality of sub-tables with a fixed relationship existing between values at a corresponding locations in the plurality of sub-tables;
a cryptographic operation block configured to perform a cryptographic operation using the look-up table, the cryptographic operation block including a register and configured to load from said look-up table data values from corresponding locations in each of said sub-tables into the register; and
a verification block configured to perform an exclusive OR of corresponding bits of first and second values loaded in said register, and a comparator configured to compare the output of said logic unit with a third value loaded in said register.

16. The system of claim 15 wherein the cryptographic operation block comprises a computation unit configured to perform operations of said cryptographic operation based on said output signal.

17. The system of claim 15 wherein the cryptographic operation block is configured to, based on an output signal from the verification block, perform an operation of said cryptographic operation using said loaded data values.

18. The system of claim 15 wherein each data value loaded from each of said sub-tables into the register comprises one byte, and wherein four or more bytes of data are loaded from the table into the register.

19. The system of claim 15 wherein said cryptographic operation block is configured to perform a cryptographic operation based on a block cipher.

20. The system of claim 15 wherein said cryptographic operation block is configured to perform a cryptographic operation based on an Advanced Encryption Standard algorithm.

21. The system of claim 15 wherein the cryptographic operation block is configured to reset when an output from the verification block indicates that said fixed relation does not exist between said loaded data values.

22. The system of claim 15 wherein said cryptographic operation block is configured to perform a rotation operation of said data values loaded from said look-up table.

23. A system, comprising:
a memory configured to store a look-up table having a plurality of sub-tables with a fixed relationship existing between values at a corresponding locations in the plurality of sub-tables;
a cryptographic operation block configured to perform a cryptographic operation using the look-up table, the cryptographic operation block including a register and configured to load from said look-up table data values from corresponding locations in each of said sub-tables into the register; and
a verification block configured to verify that said fixed relation exists between at least two of said data values loaded in said register, wherein each sub-table of the plurality has a same number of data values of a fixed bit-length, the data value at any location a in said first and second sub-tables is equal to S[a], the data value at the location a in said third sub-table is equal to the polynomial product S[a]*{03}, and the data value at the location a in the fourth sub-table is equal to the polynomial product S[a]*{02}, and wherein said verification block includes logic configured to perform an exclusive OR operation between corresponding bits of the data values loaded into the register from the first and fourth sub-tables, and a comparator configured to compare a result of said exclusive OR with the data value loaded into the register from said third sub-table.

24. The system of claim 23 wherein the cryptographic operation block is configured to reset when an output from the verification block indicates that said fixed relation does not exist between said loaded data values.

25. The system of claim 23 wherein said cryptographic operation block is configured to perform a rotation operation of said data values loaded from said look-up table.

26. A device, comprising:
means for performing a cryptographic operation using data values retrieved from a plurality of look-up tables with a fixed relation existing between values at corresponding locations in each table of the plurality of look-up tables;
means for retrieving from said look-up tables data values from corresponding locations in each of said look-up tables; and
means for verifying that said fixed relation exists between at least two retrieved data values, the means for verifying including
means for performing an exclusive OR of corresponding bits of first and second values retrieved by the means for retrieving; and
means for comparing an exclusive OR result with a third value retrieved by the means for retrieving.

27. The device of claim 26 wherein the means for performing a cryptographic operation comprises a computation unit configured to perform operations of said cryptographic operation based on an output of the means for verifying.

28. The device of claim 26 wherein the plurality of tables are a plurality of sub-tables of a single look-up table.

29. A non-transitory computer-readable medium whose contents cause at least one processing device to perform a method, the method comprising:
performing a cryptographic operation using data values retrieved from a look-up table having a plurality of sub-tables with a fixed relation existing between values at corresponding locations in each sub-table of the plurality of sub-tables;
retrieving from said look-up table data values from corresponding locations in each of said sub-tables; and
verifying that said fixed relation exists between at least two retrieved data values, wherein the verifying includes:
performing an exclusive OR of corresponding bits of first and second values retrieved from the look-up table; and
comparing a result of performing the exclusive OR with a third value retrieved from the look-up table.

30. The non-transitory computer-readable medium of claim 29 wherein the performing the cryptographic operation is based on the verifying.

31. A method, comprising:
performing a cryptographic operation using data values retrieved from a look-up table having a plurality of sub-tables with a fixed relation existing between values at corresponding locations in each sub-table of the plurality of sub-tables; and
detecting a fault attack during the cryptographic operation by:
retrieving from said look-up table data values from corresponding locations in each of a said sub-tables;
verifying that said fixed relation exists between at least two retrieved data values, wherein the verifying includes performing an exclusive OR of corresponding bits of first and second values retrieved from the look-up table and comparing a result of the exclusive OR with a third value retrieved from the look-up table; and
generating an output signal based on said comparison, wherein the retrieving, the performing and the generating are performed by a configured electronic device.

32. The method of claim 31, further comprising performing the cryptographic operation using at least one retrieved data value when a fault is not detected.

33. The method of claim 31, further comprising resetting the cryptographic operation when a fault is detected.

* * * * *